US010539786B2

(12) United States Patent
Sinha et al.

(10) Patent No.: US 10,539,786 B2
(45) Date of Patent: Jan. 21, 2020

(54) ROTATABLE PRISMS FOR CONTROLLING DISPERSION MAGNITUDE AND ORIENTATION AND METHODS OF USE

(71) Applicant: Verily Life Sciences LLC, Mountain View, CA (US)

(72) Inventors: Supriyo Sinha, Menlo Park, CA (US); John D. Perreault, Mountain View, CA (US); Cheng-Hsun Wu, Mountain View, CA (US)

(73) Assignee: VERILY LIFE SCIENCES LLC, South San Francisco, CA (US)

( * ) Notice: Subject to any disclaimer, the term of this patent is extended or adjusted under 35 U.S.C. 154(b) by 210 days.

(21) Appl. No.: 15/481,385

(22) Filed: Apr. 6, 2017

(65) Prior Publication Data

US 2017/0343824 A1 Nov. 30, 2017

Related U.S. Application Data

(60) Provisional application No. 62/342,268, filed on May 27, 2016.

(51) Int. Cl.
*G02B 5/04* (2006.01)
*G02B 27/00* (2006.01)

(52) U.S. Cl.
CPC .......... *G02B 27/0062* (2013.01); *G02B 5/04* (2013.01)

(58) Field of Classification Search
CPC .............................. G02B 5/04; G02B 27/0062
(Continued)

(56) References Cited

U.S. PATENT DOCUMENTS 2,792,751 A * 5/1957 Coleman ............... G02B 13/10
359/669
2,810,323 A * 10/1957 Coleman ............... G02B 13/10
359/669
(Continued)

FOREIGN PATENT DOCUMENTS

EP 0916981 A1 5/1999
EP 2720075 A1 4/2014
(Continued)

OTHER PUBLICATIONS

Qing Ye et al., "High-efficiency electrically tunable phase diffraction grating based on a transparent lead magnesium niobate-lead titanite electro-optic ceramic", Optics Letters, Optical Society of America, vol. 36, No. 13, Jul. 1, 2011, pp. 2453-2455.
(Continued)

*Primary Examiner* — Ricky D Shafer
(74) *Attorney, Agent, or Firm* — Kilpatrick Townsend & Stockton LLP

(57) ABSTRACT

Systems and methods for dispersing an optical beam are disclosed. In one implementation, an optical system includes a first double Amici prism and a second double Amici prism. The first and second double Amici prisms are aligned along an optical axis of the system and configured to transmit the optical beam. At least one of the first and second double Amici prisms is rotatable relative to the other around the optical axis. Advantageously, the disclosed systems and methods allow for efficient and versatile adjustment of the magnitude and/or orientation of the dispersion of the optical beam.

20 Claims, 6 Drawing Sheets

(58) Field of Classification Search
USPC .................................................. 359/837, 900
See application file for complete search history.

(56) References Cited

U.S. PATENT DOCUMENTS

| | | | | |
|---|---|---|---|---|
| 2,821,111 | A * | 1/1958 | Coleman | G02B 13/10 |
| | | | | 359/669 |
| 2,828,670 | A | 4/1958 | Luboshez | |
| 2,975,668 | A * | 3/1961 | Eckel | G02B 26/0883 |
| | | | | 359/211.1 |
| 3,907,430 | A * | 9/1975 | Mann | G01J 3/02 |
| | | | | 356/332 |
| 4,850,686 | A * | 7/1989 | Morimoto | G02B 26/0891 |
| | | | | 359/196.1 |
| 5,461,513 | A * | 10/1995 | Maruyama | G02B 5/06 |
| | | | | 359/554 |
| 5,486,948 | A * | 1/1996 | Imai | G03B 35/08 |
| | | | | 348/42 |
| 5,579,177 | A * | 11/1996 | Stumpf | G02B 6/06 |
| | | | | 359/615 |
| 5,591,981 | A | 1/1997 | Heffelfinger et al. | |
| 6,043,882 | A | 3/2000 | De Wolf et al. | |
| 6,747,738 | B2 * | 6/2004 | Knapp | G01J 3/14 |
| | | | | 348/E9.01 |
| 7,982,983 | B2 * | 7/2011 | Sanghera | G02B 1/02 |
| | | | | 359/834 |
| 9,557,630 | B1 * | 1/2017 | Marason | G03B 21/14 |
| 2009/0309049 | A1 | 12/2009 | Van Dijk et al. | |
| 2010/0314554 | A1 | 12/2010 | Galimberti et al. | |
| 2011/0228267 | A1 | 9/2011 | Hayashi | |
| 2012/0069344 | A1 | 3/2012 | Liu | |
| 2012/0307247 | A1 | 12/2012 | Tan et al. | |
| 2013/0100525 | A1 | 4/2013 | Chiang et al. | |
| 2013/0329270 | A1 | 12/2013 | Nielsen et al. | |
| 2016/0202178 | A1 | 7/2016 | Acosta | |
| 2017/0089837 | A1 | 3/2017 | Matsumoto et al. | |
| 2017/0176338 | A1 | 6/2017 | Wu et al. | |

FOREIGN PATENT DOCUMENTS

| | | |
|---|---|---|
| GB | 859208 A | 1/1961 |
| JP | S5214417 A | 2/1977 |
| JP | S63101818 A | 5/1988 |
| JP | 2015219501 A | 12/2015 |
| WO | 2016115018 A1 | 7/2016 |

OTHER PUBLICATIONS

Yanli Zhang et al., "High-efficiency, liquid-crystal-based, controllable diffraction grating", Journal of the Optical Society of America, vol. 22, No. 11, Nov. 2005, p. 2510.

Sirleto L. et al., "Electro-Optical Switch and Continuously Tunable Filter Based on a Bragg Grating in a Planar Waveguide With a Liquid Crystal Overlayer", Optical Engineering, Soc. of Photo-Optical Instrumentation Engineers, vol. 41, No. 11, Nov. 2002, pp. 2890-2898.

International Search Report of International Application No. PCT/US2016/067684 dated Mar. 9, 2017.

International Search Report of International Application No. PCT/US2017/027510 dated Jul. 7, 2017.

Shaked et al., "Dispersion Compensation with a Prism-pair", Physics Optics, Nov. 4, 2014.

International Search Report of International Application No. PCT/US2017/034875 dated Aug. 21, 2017.

International Search Report of International Application No. PCT/US2017/034877 dated Aug. 17, 2017.

* cited by examiner

ROTATABLE PRISMS FOR CONTROLLING DISPERSION MAGNITUDE AND ORIENTATION AND METHODS OF USE

CROSS-REFERENCE TO RELATED APPLICATIONS

This application claims the benefit of and incorporates by reference the content of U.S. Provisional App. No. 62/342,268, filed May 27, 2016.

BACKGROUND

Technical Field

The present disclosure generally relates to optical systems and methods. More particularly, and without limitation, the disclosed embodiments relate to systems and methods for controlling the magnitude and/or orientation of dispersion in an optical system.

Background Description

Many optical systems and techniques introduce dispersion in the optical path to obtain spectral information of the optical signal or to filter unwanted wavelengths from the optical output. Some systems use a series of prisms and/or gratings whose positions and parameters are specifically designed to achieve a desired dispersion with a certain magnitude and/or orientation. However, in some applications, the dispersion needs to be adjustable to control the spread of the spectrum and/or the spectral resolution of the optical signal. For example, in some instances, a dispersed optical beam may be projected onto a one-dimensional or a two-dimensional sensor array to capture the spectral information. Due to the limited number of pixels and size of a given sensor array, the magnitude of dispersion need to be adjusted to control the bandwidth and the spectral resolution of the captured spectral data.

To achieve some adjustment of dispersion, some common approaches adjust the optical path length of the optical beam between a pair of dispersive elements, e.g., gratings or prisms. For example, increasing the optical path length may increase the magnitude of dispersion. However, the adjustment of the optical path length incurs the use of mechanical translational stages to move the pair of dispersive elements towards or away from each other. In some instances, a large lateral translation may be needed, which is typically very slow. Further, adjustment of the optical path length would change the footprint of the optical system and thus is not ideal for some applications. In addition, the insertion of the grating or prism pair may alter the direction of the beam propagating through the system. Therefore, there is a need for compact systems and methods that allow for efficient, rapid, and flexible adjustment of dispersion.

SUMMARY

The embodiments of the present disclosure include systems and methods that allow for efficient and versatile adjustment of dispersion of an optical beam. Advantageously, the exemplary embodiments allow for continuous adjustment of dispersion without altering a propagation direction of the optical beam.

According to an exemplary embodiment of the present disclosure, an optical system for dispersing an optical beam is described. The system includes a first double Amici prism and a second double Amici prism. The first and second double Amici prisms are aligned along an optical axis of the system and configured to transmit the optical beam. At least one of the first and second double Amici prisms is rotatable relative to the other around the optical axis.

According to a further exemplary embodiment of the present disclosure, a method for dispersing an optical beam is described. The method includes the steps of receiving the optical beam, transmitting the optical beam through a first double Amici prism and a second double Amici prism aligned along an optical axis, dispersing the optical beam to a predetermined magnitude by rotating at least one of the first and second double Amici prisms relative to the other around the optical axis.

According to a further exemplary embodiment of the present disclosure, a method for configuring a hyperspectral imaging system is described. The method includes the steps of receiving the optical beam and transmitting the optical beam through a set of optical elements aligned along an optical axis. The set of optical elements includes a first double Amici prism, a second double Amici prism, and at least one lens. The method further includes dispersing the optical beam to a predetermined magnitude by rotating at least one of the first and second double Amici prisms relative to the other around the optical axis.

Additional features and advantages of the disclosed embodiments will be set forth in part in the description that follows, and in part will be obvious from the description, or may be learned by practice of the disclosed embodiments. The features and advantages of the disclosed embodiments will be realized and attained by the elements and combinations particularly pointed out in the appended claims.

It is to be understood that both the foregoing general description and the following detailed description are examples and explanatory only and are not restrictive of the disclosed embodiments as claimed.

The accompanying drawings constitute a part of this specification. The drawings illustrate several embodiments of the present disclosure and, together with the description, serve to explain the principles of the disclosed embodiments as set forth in the accompanying claims.

DETAILED DESCRIPTION

Figure 1:
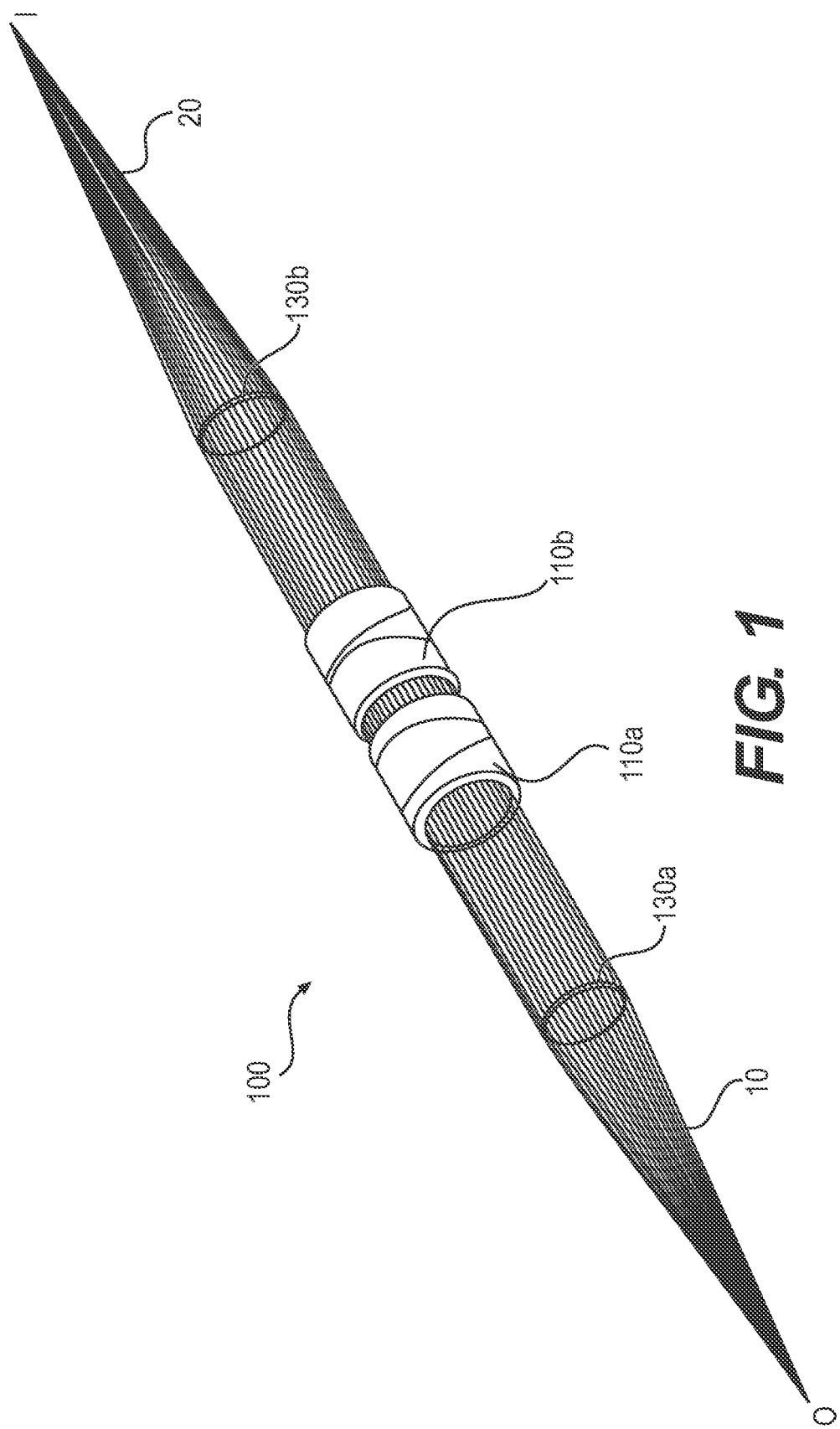
FIG. 1 is a schematic perspective representation of an exemplary optical system, according to embodiments of the present disclosure.

The disclosed embodiments relate to systems and methods for dispersing an optical beam. Advantageously, the exemplary embodiments employ "direct vision" or "non-deviating" dispersive elements to achieve flexible adjustment of the magnitude and/or orientation of dispersion. Embodiments of the present disclosure may be implemented in a spectrometer, e.g., an imaging spectrometer, a monochromator, a spectral analyzer, a microscope, e.g., a fluorescence microscope, a confocal microscope, a transmission microscope, a reflectance microscope, etc., or a spectral imaging system, e.g., a hyperspectral imaging system. Alternatively, embodiments of the present disclosure may be implemented in a customized optical system built using suitable optical elements.

According to an aspect of the present disclosure, an optical system is provided for dispersing an optical beam having one or more wavelengths. The optical system may include a pair of non-deviating dispersive elements aligned along an optical axis. In some embodiments, the optical system may collimate the input optical beam before the dispersion.

In some embodiments, the optical beam may be an excitation light beam for illuminating a sample or an emission light beam collected from a sample. Additionally or alternatively, the optical beam may be filtered to have a desired spectrum before entering the optical system.

According to an aspect of the present disclosure, the pair of non-deviating dispersive elements is two double Amici prisms aligned along the optical axis. The dispersion of the two double Amici prisms may add up to the total dispersion of the optical beam by the optical system.

In some embodiments, at least one of the double Amici prisms is rotatable relative to each other around the optical axis. In other embodiments, both double Amici prisms may be independently rotatable around the optical axis. A rotational angle between the two double Amici prisms relative to each other around the optical axis may be continuously adjusted from about 0° to about 180°.

Advantageously, adjusting the rotational angle between the first and second double Amici prisms vary the total dispersion of the optical beam by the optical system. This eliminates the need to change the footprint of an optical setup in which the optical system is implemented and further allows for a compact design of the optical setup. Additionally, rotational stages for adjusting the rotational angle between the two double Amici prisms may operate at a speed faster than that of translational stages for adjusting the optical path length between two prisms or gratings. This further improves the speed for adjusting dispersion of the optical beam.

In some embodiments, adjustment of the rotational angle between the two double Amici prisms allows for adjustment of the magnitude of the dispersion of the optical beam. For example, when the rotational angle between the two double Amici prisms is about 0°, the dispersion of the two prisms add up to a maximum magnitude of dispersion, e.g., doubling the magnitude of dispersion of one prism. When the rotational angle between the two double Amici prisms is about 180°, the dispersion of the two prisms may cancel each other, leading to a minimum magnitude of dispersion, e.g., about zero dispersion. When the rotational angle between the two double Amici prisms is an intermediate angle between 0° and 180°, the magnitude of dispersion is between the two extremes. When the two double Amici prisms are identical, the maximum magnitude of the dispersion may double the magnitude of dispersion that can be generated by one of the double Amici prisms.

In some embodiments, when the rotational angle between the two double Amici prisms is continuously adjusted from about 0° to about 180°, the magnitude of the dispersion generated by the optical system may be continuously adjusted from the maximum magnitude to the minimum magnitude.

According to an aspect of the present disclosure, a predetermined wavelength, e.g., a center wavelength, of the optical beam would not change its propagation direction after passing through the optical system. For example, a predetermined wavelength of the input optical beam may enter the first double Amici prism along an input optical axis, and then exit the second double Amici prism along an output optical axis. The input optical axis and the output optical axis of the predetermined wavelength may remain collinear. The other wavelengths of the optical beam may transmit the optical system with suitable deviation angles that are determined by the design of the prisms.

In some embodiments, the orientation of the dispersion of the optical beam caused by the optical system may be adjusted by rotating both of the double Amici prisms. As described herein, the orientation of the dispersion may refer to an orientation of a dispersion line formed or focused on a plane orthogonal to the optical axis after the optical beam passes through the optical system. The dispersion line may have the spectrum of the optical beam spread out along a linear direction. Rotating both prisms may change the angle of incidence of the optical beam on the first prism, and thus change the deviation angles for the wavelengths of the optical beam exiting the second prism except for the predetermined wavelength. The changes of the deviation angles may then lead to a change of the orientation of the dispersion line.

As described herein, the optical beam entering the optical system to be dispersed may be referred to as an input optical beam, and the dispersed optical beam exiting the optical system may be referred to as an output optical beam. In some embodiments, the output optical beam may be further modulated, filtered, processed, and/or detected by a one-dimensional or two-dimensional array of photodetector or sensor of an imaging device.

Reference will now be made in detail to embodiments and aspects of the present disclosure, examples of which are illustrated in the accompanying drawings.

FIG. 1 is a schematic perspective representation of an exemplary optical system 100 for dispersing an optical beam. For example, system 100 may be implemented in an optical setup for generating an output optical beam 20 with a desired dispersion from an input optical beam 10. As described herein, input optical beam 10 refers to the optical beam entering and/or passing through system 100 and output optical beam 20 refers to the optical beam exiting system 100. Input optical beam 10 and output optical beam 20 are referenced separately for the describing the transmission and dispersion of the optical beam by system 100. In some embodiments, output optical beam 20 may be further filtered, modulated, and/or acquired to obtain an optical signal with a desired spectrum and/or spectral resolution.

As shown in FIG. 1, system 100 may include at least two double Amici prisms, e.g., prisms 110a and 110b. Depending on the application of system, system 100 may further include at least two lenses 130a and 130b. For example, when system 100 is implemented in a hyperspectral imaging system where emission spectra of a plurality of locations on a sample are simultaneously measured, lenses 130a and 130b may be in an imaging configuration. Lenses 130a and 130b may create a collimated space between them for input optical beam 10 to propagate through prisms 110a and 110b. System 100 may further include other optical elements, such as mirrors, beam dumps, spatial filters etc.

As described herein, an optical axis of system 100 may define a path along which a predetermined wavelength (e.g., a center wavelength) of input optical beam 10 and output optical beam 20 propagates through system 100.

As shown in FIG. 1, prisms 110a and 110b and lenses 130a and 130b are aligned along the optical axis of system 100. Input optical beam 10 may be collected from a focus spot ("O") in an optical system and collimated by lens 130a. For example, spot "O" may be at about one focal length before lens 130a. Collimated input optical beam 10 may then propagate through prisms 110a and 110b. Prisms 110a and 110b may disperse the input optical beam 10 to a desired magnitude, generating a spectrally dispersed output optical beam 20 exiting prism 110b. Additionally or alternatively, prisms 110a and 110b may change the orientation of the dispersion of output optical beam 20. Output optical beam 20 may be collected and focused by lens 130b to a focused spot ("I"). Spot "I" may be at about one focal length after lens 130b. Spot "I" may be in the form of a discrete or continuous spectrum with a desired spread and/or resolution. In some embodiments, spot "I" may be acquired by a sensor array.

Other configurations of system 100 are possible using additional optical elements, such as mirrors, lenses, filters, etc. Although double Amici prisms 110a and 110b are used as examples for the non-deviating dispersive elements of system 100, other suitable non-deviating dispersive elements, such as non-deviating compound prisms may be used consistent with the embodiments of the present disclosure.

Functions and the working principles of the components of system 100 are described in detail below.

Figure 2:
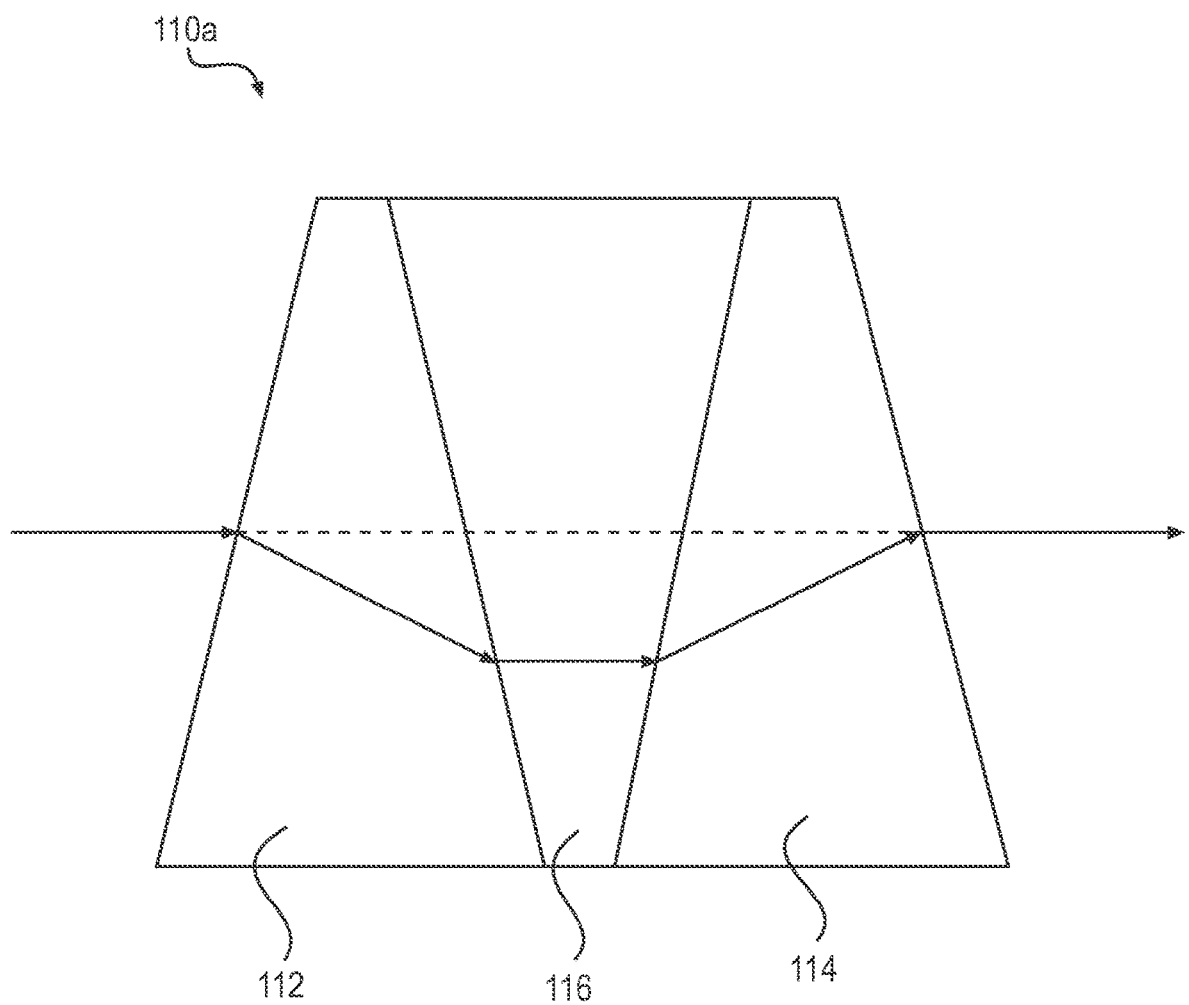
FIG. 2 is a schematic cross-sectional representation of an exemplary non-deviating dispersive element, according to embodiments of the present disclosure.

FIG. 2 is a schematic cross-sectional representation of an exemplary double Amici prism 110a. As described herein, descriptions of the features below in references to prism 110a are equally applicable to prism 110b.

As shown in FIG. 2, prism 110a includes a set of prism elements placed in series, such as first element 112, second element 114, and third element 116. These elements may be cemented together to form a solid assembly. First and second elements 112 and 114 may be made of the same glass and have the same apex angles. The design layout of prism 110a is thus symmetric about the plane passing through the center of third element 116.

First and second elements 112 and 114 are typically made of a glass having lower index of refraction relative to third element 116. For example, first and second elements 112 and 114 may be made of crown glass and third element may be made of flint glass. As described herein, the materials of the prism elements may be suitably selected to achieve a desired dispersion of input optical beam 10. In some embodiments, the selection of the materials of the prism elements of prisms 110a and 110b may be the same such that the dispersion that can be generated by prisms 110a and 110b may be the same. In other embodiments, the selection of the materials of the prism elements of prisms 110a and 110b may be different such that the dispersion that can be generated by prisms 110a and 110b may be different. Additionally, the materials of the prism elements may be designed to achieve greater linearity of total dispersion and/or to achieve higher-order dispersion effects of system 100.

As shown in FIG. 2, prism 110a may have two sloping faces on its two sides. A predetermined wavelength of input optical beam 10 may pass through the first sloping face of prism 110a and exit from the other sloping face with substantially zero deviation from the optical axis. The predetermined wavelength may depend on the design of prism 110a, such as the composition of the materials and geometry of the prism elements 112, 114, and 116. Other wavelengths of input optical beam 10 would pass through prism 110a with a wavelength-dependent deviation angle from the optical axis. Such deviation angles may also depend on the geometry of prism 110a.

Advantageously, as described above, system 100 may achieve a desired dispersion without causing deviation of the predetermined wavelength, e.g., a center wavelength of input optical beam 10. In other words, the input optical axis of the predetermined wavelength of input optical beam 10 remains substantially collinear with its output optical axis.

Figure 3:
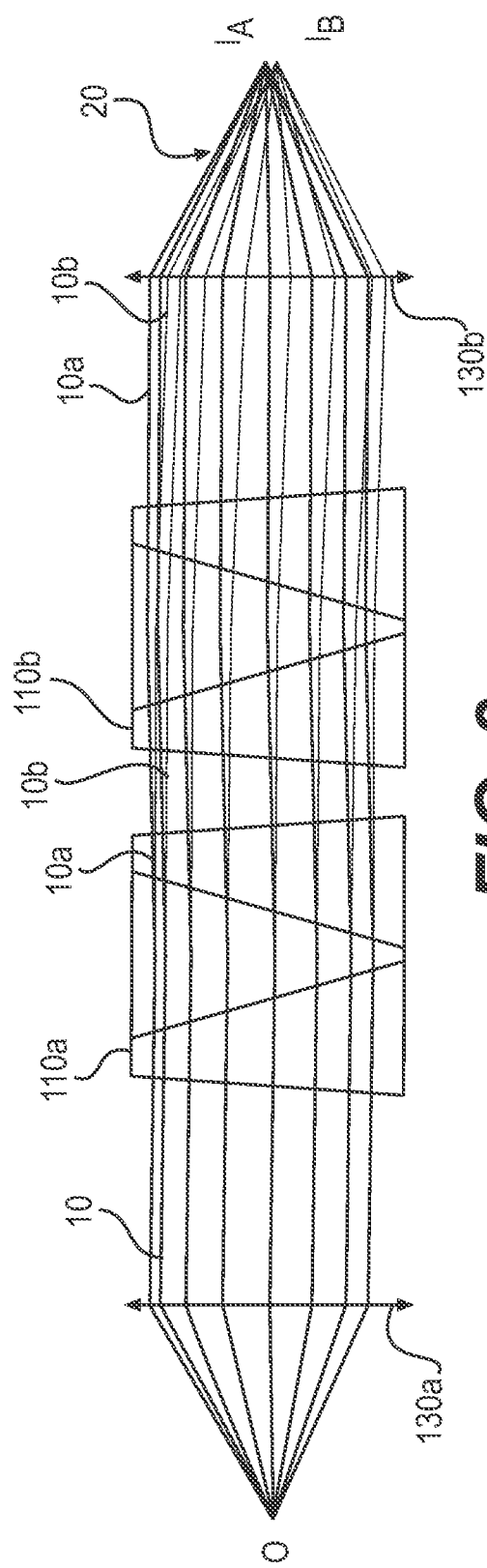
FIG. 3 is a graphical cross-sectional illustration of an example of an optical beam passing through the exemplary optical system of FIG. 1, according to embodiments of the present disclosure.
Figure 4:
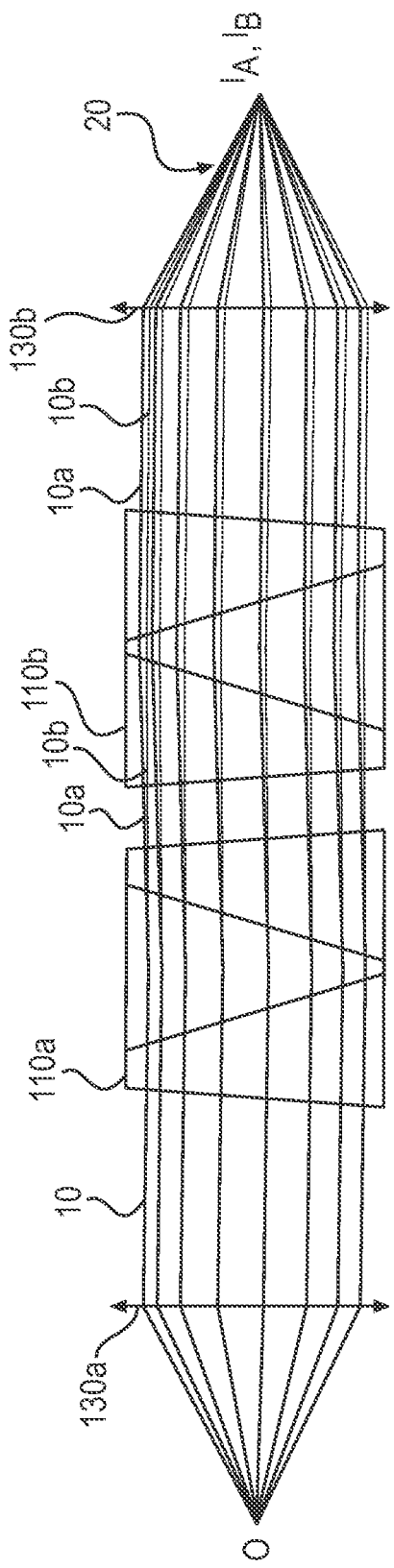
FIG. 4 is a graphical cross-sectional illustration of another example of an optical beam passing through the exemplary optical system of FIG. 1, according to embodiments of the present disclosure.

When two prisms 110a and 110b are used together in system 100, the dispersion of input optical beam 10 may be augmented or reduced. FIGS. 3 and 4 are graphical cross-sectional illustrations of two examples of input optical beam 10 passing through system 100. FIG. 3 shows that prisms 110a and 110b are aligned around the optical axis and together double the magnitude of the total dispersion. In contrast, FIG. 4 shows that prisms 110a and 110b are counter-aligned around the optical axis and the dispersion generated by prism 110a is reduced to a minimum or cancelled by prism 110b.

As shown in FIG. 3, prisms 110a and 110b are aligned with a rotational angle of about 0° relative to each other. Two exemplary wavelengths 10a and 10b of input optical beam 10 are deflected at different angles after passing through prism 110a. While propagating in the distance from prism 110a to prism 110b, input optical beam 10 is dispersed and filled with spectral information. The two wavelengths 10a and 10b of input optical beam 10 are further deflected and deviated from each other after passing through prism 110b. Lens 130b may then focus the two wavelengths 10a and 10b in the output optical beam 20 to two different spots shifted from each other, e.g., "$I_A$" and "$I_B$,". If output optical beam 20 is acquired by a sensor, the focus spots of the two different wavelengths 10a and 10b would end up at two different locations laterally shifted from each other on the sensor.

In contrast to the example shown in FIG. 3, FIG. 4 shows that prisms 110a and 110b are counter-aligned with a rotational angle of about 180° relative to each other. Two exemplary wavelengths 10a and 10b of input optical beam 10 are similarly deflected at different angles after passing through prism 110a as describe above. Input optical beam 10 is thus dispersed in the space between prism 110a to prism 110b. Then, the two wavelengths 10a and 10b of input optical beam 10 are deflected by prism 110b to an opposite direction, thereby reducing or cancelling the dispersion of output optical beam 20.

As shown in FIG. 4, in some embodiments, when prisms 110a and 110b are identical, the dispersion generated by prism 110a of the two wavelengths 10a and 10b may be cancelled to zero after passing through prism 110b. For example, the two wavelengths 10a and 10b of input optical beam 10 may be deflected back by prism 110b to be aligned with the optical axis. Lens 130b may then focus the two wavelengths 10a and 10b to spots "$I_A$" and "$I_B$" that overlap with each other. If output optical beam 20 is acquired by a sensor, the focus spots of the two different wavelengths 10a and 10b would be acquired at the same location, thereby cancelling the dispersion.

As described above, when prisms 110a and 110b are aligned with each other around the optical axis, the dispersion generated by system 100 may be maximized, e.g., double of the amount of dispersion that can be generated by prism 110a. When prisms 110a and 110b are counter-aligned with each other around the optical axis, the dispersion generated by system 100 may be minimized, e.g., cancelled to zero when prism 110b is identical to prism 110a. By adjusting the rotational angle between prisms 110a and 110b around the optical axis from about 0° to about 180°, the dispersion of output optical beam 20 may be varied to a desired intermediate magnitude between the maximum and minimum.

The rotation of the two prisms 110a and 110b around the optical axis may be achieved using any suitable rotating device, such as a stepper motor rotary stage or a thermal motor rotary stage. In some embodiments, only one of the prisms 110a and 110b may be rotated to adjust the dispersion of output optical beam 20. In other embodiments, both prisms 110a and 110b may be rotated to adjust the dispersion of output optical beam 20.

As described herein, the two wavelengths 10a and 10b of input optical beam 10 shown in FIG. 3 are exemplary only. Multiple or infinite wavelengths of input optical beam 10 may pass through system 100.

As described above, output optical beam 20 may be acquired or detected by a sensor array. For example, a light emitting spot emitting input optical beam 10 may become multiple spots of output optical beam 20 after passing through system 100. The multiple spots of output optical beam 20 acquired on the sensor may be laterally shifted from each other along a virtual dispersion line. In some situations, if input optical beam 10 has a continuous spectrum, a light emitting spot would be acquired as a spectrally dispersed line on the sensor. The light intensity of a given spot or at a given location along the dispersed line would correspond to the intensity provided by the corresponding wavelength. Hence, the intensity versus distance along the dispersion line can be transformed to a relationship between the intensity and the wavelength.

Figure 5:
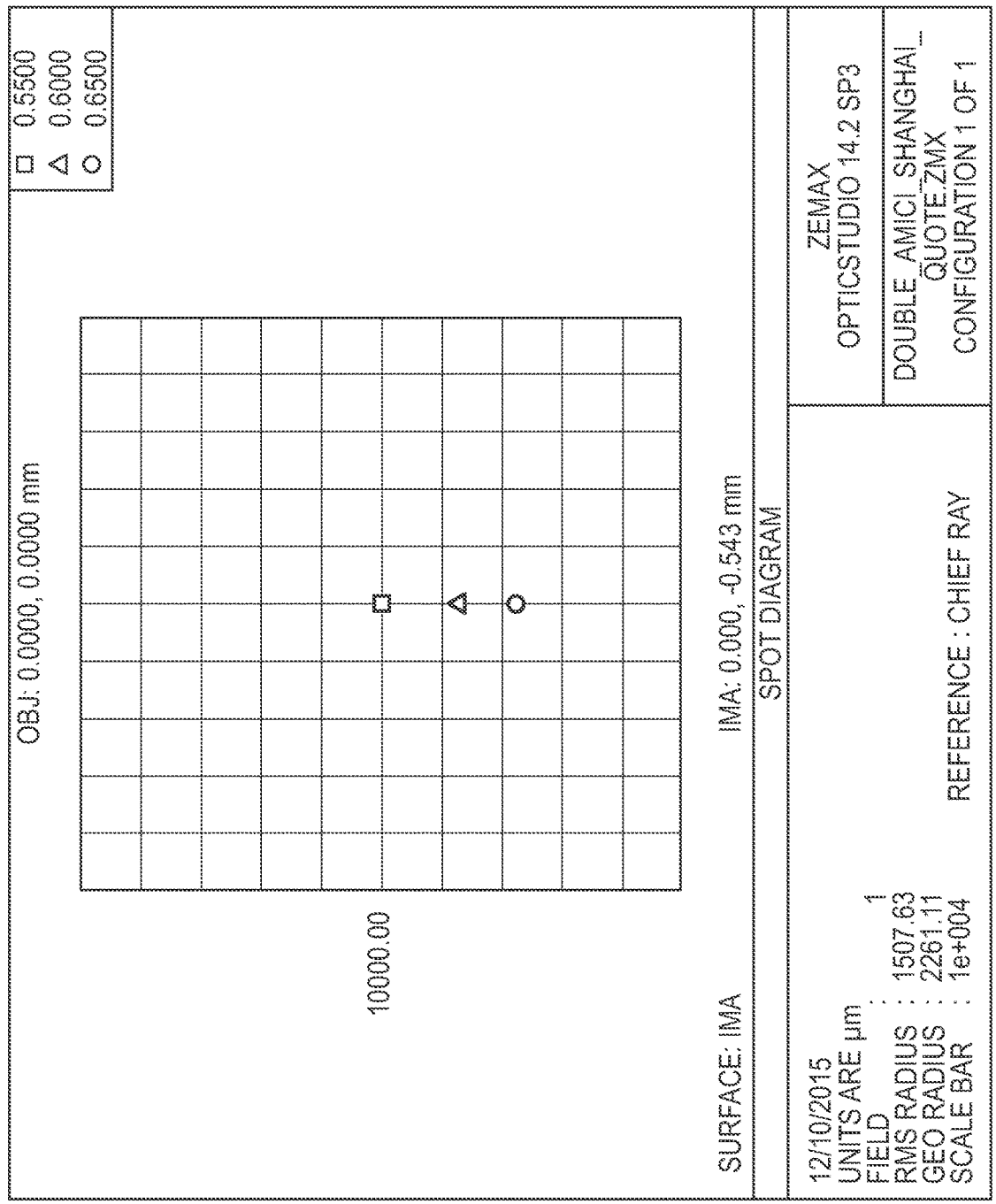
FIG. 5 is a diagram of an optical simulation result of dispersion generated by the exemplary optical system of FIG. 1, according to embodiments of the present disclosure.
Figure 6:
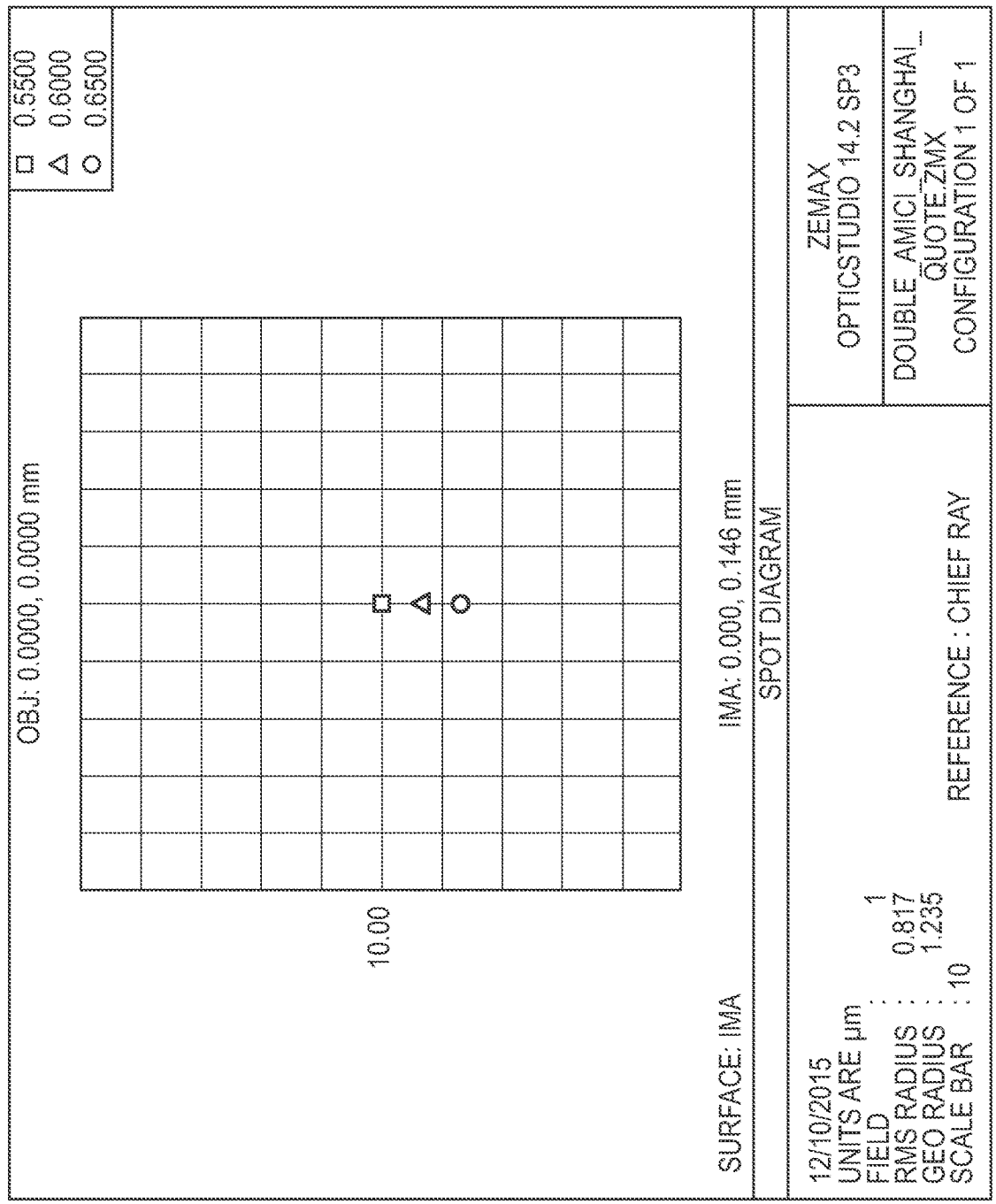
FIG. 6 is a diagram of another optical simulation result of dispersion generated by the exemplary optical system of FIG. 1, according to embodiments of the present disclosure.

FIGS. 5 and 6 are diagrams of optical simulation results of dispersing an optical beam with three wavelengths (e.g., 500 nm, 600 nm, and 650 nm) by system 100. As shown in FIGS. 5 and 6, focus spots of the three wavelengths are vertically shifted from each other along a virtual dispersion line. The spot of wavelength 550 nm is at located at the center of the diagram, the spot of wavelength 600 nm is located below that of wavelength 550 nm, and the spot of wavelength 650 nm is located below that of wavelength 600 nm.

In some embodiments, the spacing between the spots may depend on the magnitude of dispersion of system 100. For example, a dispersion magnitude of system 100 for generating the simulation result shown in FIG. 5 is adjusted to be greater than that for generating the simulation result shown in FIG. 6. Accordingly, the spacing between the spots of the three wavelengths is greater in FIG. 5 than that in FIG. 6.

Advantageously, the adjustment of the dispersion magnitude may allow any bandwidth of input optical beam 10 to suitably fill a desired space of a sensor. This may improve the efficiency of using the space on the sensor and may further improve the measurement throughput of an optical measurement system.

For example, in fluorescence spectroscopy or microscopy, system 100 may be used to increase the magnitude of dispersion of a desired range of fluorescence emission spectrum of fluorophores. This can increase the spectral resolution of the desired range, thereby providing more information of the fluorophores or fluorescent molecules in a sample. In other instances, such as in multi-spot hyperspectral imaging systems, system 100 may be used to reduce the dispersion magnitude of sparse fluorescence emission spectra. This allows for more fluorescence emission spectra to be measured simultaneously, thereby increasing the efficiency of using the sensor space and the measurement throughput of the hyperspectral imaging system.

In some embodiments, prisms 110a and 110b may be designed to achieve linear dispersion of output optical beam 20. In such instances, the distance between the focus spots of a given wavelength and a center wavelength along the dispersion line is linearly proportional to the difference between the given wavelength and the center wavelength. In other embodiments, prisms 110a and 110b may be designed to achieve nonlinear dispersion of output optical beam 20. In such instances, the deviation angle of a given wavelength from the optical axis of the center wavelength may be proportional to the difference between the given wavelength and the center wavelength.

As described above, in some embodiments, prisms 110a and 110b may be adjusted to change the orientation of dispersion of output optical beam 20. For example, the orientation of dispersion or the dispersion line along which the focus spots are aligned as shown in FIGS. 5 and 6 are along the vertical direction. When both prisms 110a and 110b are rotated together to a given angle around the optical axis, the orientation of dispersion or the dispersion line may be adjusted to a different direction. For example, if both prisms 110a and 110b are together further rotated by about 90°, the orientation of dispersion or the dispersion line along which the focus spots are aligned as shown in FIGS. 5 and 6 may be along a horizontal direction.

Figure 7:
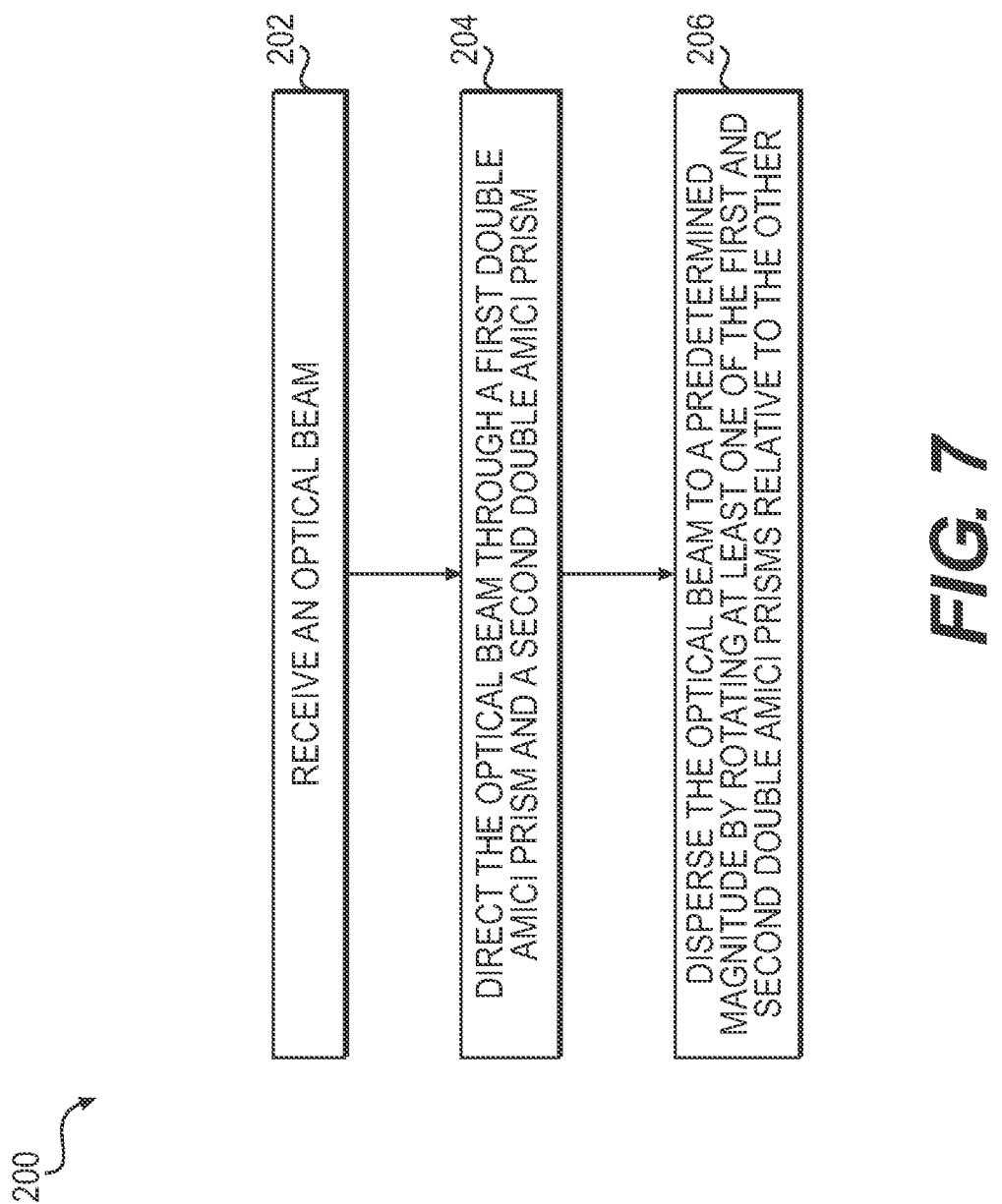
FIG. 7 is a flowchart of an exemplary method for dispersing an optical beam, according to embodiments of the present disclosure.

System 100 as described herein may be utilized in a variety of methods and devices for dispersing an optical beam. FIG. 7 is a flowchart of an exemplary method 200 for dispersing of an optical beam. Method 200 uses system 100 and features of the embodiments of system 100 described above in reference to FIGS. 1-4.

At step 202, an optical beam may be received by system 100. Depending on the application of system 100 and/or the collimation status of the optical beam, the optical beam may be collected and collimated by lens 130a before dispersion and focused by lens 130b after dispersion. At step 204, the optical beam may be transmitted through a pair of double Amici prisms 110a and 110b aligned along the optical axis. At step 206, the optical beam may be dispersed to a predetermined magnitude by rotating at least one of prisms 110a and 110b relative to the other around the optical axis.

Method 200 may further include additional steps. For example, method 200 may include calibrating system 100 before rotating the prisms. Other optical components in system 100, such as lenses 130a and 130b, may be suitably calibrated and aligned such that the input optical axis and the output optical axis of a predetermined wavelength of the optical beam remain collinear.

In some embodiments, method 200 may further include varying the magnitude of dispersion by adjusting a rotational angle between the first and second prisms 110a and 110b around the optical axis. Additionally or alternatively, method 200 may further include adjusting the dispersion of the optical beam to a predetermined orientation by rotating both prisms 110*a* and 110*b* around the optical axis.

While illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. An optical system for dispersing an optical beam, comprising:
   a first double Amici prism; and
   a second double Amici prism;
   wherein the first and second double Amici prisms are aligned along an optical axis of the optical system and configured to transmit the optical beam;
   wherein at least one of the first and second double Amici prisms is rotatable relative to the other around the optical axis;
   wherein each of the first and second double Amici prisms comprises a first element, a second element, and a third element;
   wherein the third element is arranged between the first element and the second element;
   wherein each of the first element and the second element is made of a first glass having a first index of refraction, and the third element is made of a second glass having a second index of refraction that is different from the first index of refraction; and
   wherein an input optical axis and an output optical axis of a predetermined wavelength of the optical beam are collinear.

2. The system of claim 1, wherein the first and second double Amici prisms are independently rotatable around the optical axis.

3. The system of claim 1, wherein at least one of the first and second double Amici prisms is rotatable relative to the other around the optical axis by a rotational angle ranging from 0° to 180°.

4. The system of claim 3, wherein a magnitude of the dispersion of the optical beam varies with the rotational angle.

5. The system of claim 4, wherein the optical beam is dispersed to a maximum magnitude when the rotational angle is 0°.

6. The system of claim 4, wherein the optical beam is dispersed to a minimum magnitude when the rotational angle is 180°.

7. The system of claim 1, wherein the first double Amici prism and the second double Amici prism are identical.

8. The system of claim 1, wherein an orientation of the dispersion of the optical beam is determined by rotational angles of both of the first and second double Amici prisms around the optical axis.

9. The system of claim 1, further comprising a first lens configured to collimate the optical beam before the dispersion and a second lens configured to focus the optical beam after the dispersion.

10. The system of claim 1, wherein each of the first and second double Amici prisms comprises a first face through which the optical beam enters and a second face through which the optical beam exits, and each of the first face and the second face is oriented at a non-perpendicular angle with respect to the optical axis.

11. A method for dispersing an optical beam, comprising:
    receiving the optical beam;
    transmitting the optical beam through a first double Amici prism and a second double Amici prism, the first and second double Amici prisms being aligned along an optical axis; and
    dispersing the optical beam to a predetermined magnitude by rotating at least one of the first and second double Amici prisms relative to the other around the optical axis;
    wherein each of the first and second double Amici prisms comprises a first element, a second element, and a third element;
    wherein the third element is arranged between the first element and the second element;
    wherein each of the first element and the second element is made of a first glass having a first index of refraction, and the third element is made of a second glass having a second index of refraction that is different from the first index of refraction; and
    wherein an input optical axis and an output optical axis of a predetermined wavelength of the optical beam are collinear.

12. The method of claim 11, wherein the first and second double Amici prisms are independently rotatable around the optical axis.

13. The method of claim 11, further comprising varying the predetermined magnitude by adjusting a rotational angle between the first and second double Amici prisms around the optical axis to a degree ranging from 0° to 180°.

14. The method of claim 13, further comprising dispersing the optical beam to a maximum magnitude when the rotational angle is 0°.

15. The method of claim 13, further comprising dispersing the optical beam to a minimum magnitude when the rotational angle is 180°.

16. The method of claim 11, wherein the first double Amici prism and the second double Amici prism are identical.

17. The method of claim 11, further comprising adjusting an orientation of the dispersion of the optical beam by rotating both of the first and second double Amici prisms around the optical axis.

18. The method of claim 11, further comprising
collimating, using a first lens, the optical beam before the dispersion; and
focusing, using a second lens, the optical beam after the dispersion.

19. The method of claim 11, wherein each of the first and second double Amici prisms comprises a first face through which the optical beam enters and a second face through which the optical beam exits, and each of the first face and the second face is oriented at a non-perpendicular angle with respect to the optical axis.

20. A method for configuring a hyperspectral imaging system, comprising:
receiving an optical beam;
transmitting the optical beam through a set of optical elements aligned along an optical axis, the set of optical elements comprising:
a first double Amici prism;
a second double Amici prism; and
at least one lens; and
dispersing the optical beam to a predetermined magnitude by rotating at least one of the first and second double Amici prisms relative to the other around the optical axis;
wherein each of the first and second double Amici prisms comprises a first element, a second element, and a third element;
wherein the third element is arranged between the first element and the second element;
wherein each of the first element and the second element is made of a first glass having a first index of refraction, and the third element is made of a second glass having a second index of refraction that is different from the first index of refraction; and
wherein an input optical axis and an output optical axis of a predetermined wavelength of the optical beam are collinear.

* * * * *